US006320995B1

(12) United States Patent
Schroeder

(10) Patent No.: US 6,320,995 B1
(45) Date of Patent: Nov. 20, 2001

(54) LOSS EQUALIZATION BY MEANS OF PORT INTERCONNECTIVITY IN A MULTISTAGE OPTICAL SWITCH

(75) Inventor: Dale Schroeder, Scotts Valley, CA (US)

(73) Assignee: Agilent Technologies, INC, Palo Alto, CA (US)

( * ) Notice: Subject to any disclaimer, the term of this patent is extended or adjusted under 35 U.S.C. 154(b) by 0 days.

(21) Appl. No.: 09/372,357

(22) Filed: Aug. 11, 1999

(51) Int. Cl.[7] ................................. G02B 6/26; G02B 6/42
(52) U.S. Cl. ................................................. 385/17; 385/18
(58) Field of Search .................................. 385/16, 17, 18, 385/19, 20

(56) References Cited

U.S. PATENT DOCUMENTS

| 4,988,157 | 1/1991 | Jackel et al. ................. 350/96.13 |
| 5,699,462 | 12/1997 | Fouquet et al. ..................... 385/18 |
| 5,903,686 | 5/1999 | MacDonald ........................ 385/16 |
| 6,160,928 | * 12/2000 | Schroeder ........................... 385/18 |
| 6,198,856 | * 3/2001 | Schroeder et al. ................. 385/17 |
| 6,208,778 | * 3/2001 | Donald ............................. 385/17 |

FOREIGN PATENT DOCUMENTS

| 403263015-A | * 11/1991 | (JP) | ...................................... 359/128 |
| 404124994-A | * 4/1992 | (JP) | ...................................... 379/379 |

* cited by examiner

Primary Examiner—Frank G. Font
Assistant Examiner—Layla Lauchman

(57) ABSTRACT

A multistage optical switch includes a stage-to-stage connectivity scheme that provides equalization of losses encountered as optical signals traverse switching crosspoints. Each stage includes more than one switching unit having a first array of input ports and a second array of output ports that are selectively coupled by varying the crosspoints between transmissive states and reflective states. The input ports of a particular switching unit and the output ports of the same unit have rankings that are reflective of the number of optical crosspoints that must be traversed by optical signals propagating between input and output ports having the same ranking. High ranking output ports of the switching units of one stage are optically coupled to low ranking input ports of the subsequent stage, thereby defining stage-to-stage optical paths that ensure equalization in the sums of the crosspoints that are traversed when optical signals propagate through the two stages. Preferably, the connectivity of the second stage to a third stage is a mirror image of the connectivity of the first and second stages.

19 Claims, 4 Drawing Sheets

LOSS EQUALIZATION BY MEANS OF PORT INTERCONNECTIVITY IN A MULTISTAGE OPTICAL SWITCH

TECHNICAL FIELD

The invention relates generally to optical switching arrangements and more particularly to connectivity among switching units in a multistage optical switch.

BACKGROUND ART

While signals within telecommunications and data communications networks have been traditionally exchanged by transmitting electrical signals via electrically conductive lines, an alternative medium of data exchange is the transmission of optical signals through optical fibers. Information is exchanged in the form of modulations of laser-produced light. The equipment for efficiently generating and transmitting the optical signals has been designed and implemented, but the design of optical switches for use in telecommunications and data communications networks is problematic. As a result, switching requirements within a network that transmits optical signals is often satisfied by converting the optical signals to electrical signals at the inputs of a switching network, then reconverting the electrical signals to optical signals at the outputs of the switching network.

Recently, reliable optical switching systems have been developed. U.S. Pat. No. 5,699,462 to Fouquet et al., which is assigned to the assignee of the present invention, describes a switching matrix that may be used for routing optical signals from one of a number of parallel input optical fibers to any one of a number of parallel output optical fibers. Another such matrix of switching elements is described in U.S. Pat. No. 4,988,157 to Jackel et al. An isolated switching element 10 is shown in FIG. 1, while a 5×5 matrix 32 of switching elements is shown in FIG. 2. The optical switch of FIG. 1 is formed on a substrate. The substrate may be a silicon substrate, but other materials may be used. The optical switch 10 includes planar waveguides defined by a lower cladding layer 14, a core 16, and an upper cladding layer, not shown. The core is primarily silicon dioxide, but with other materials that achieve a desired index of refraction for the core. The cladding layers are formed of a material having a refractive index that is different from the refractive index of the core material, so that optical signals are guided along the waveguides.

The core material 16 is patterned to form an input waveguide 20 and an output waveguide 26 of a first optical path and to define a second input waveguide 24 and a second output waveguide 22 of a second optical path. The upper cladding layer is then deposited over the patterned core material. A gap is formed by etching a trench 28 through the core material and the two cladding layers to the substrate. The waveguides intersect the trench at an angle of incidence greater than the critical angle of total internal reflection (TIR) when the crosspoint 30 of the waveguides is filled with a vapor or gas. Thus, TIR diverts light from the input waveguide 20 to the output waveguide 22, unless an index-matching fluid resides within the crosspoint 30 between the aligned waveguides 20 and 26. The trench 28 is positioned with respect to the four waveguides such that one sidewall of the trench passes through or slightly offset from the intersection of the axes of the waveguides.

The above-identified patent to Fouquet et al. describes a number of alternative approaches to switching the switching element 10 between a transmissive state and a reflective state. The element includes at least one heater that can be used to manipulate fluid within the trench 28. One approach is illustrated in FIG. 1. The switching element 10 includes two microheaters 38 and 40 that control the position of a bubble within the fluid-containing trench. The fluid within the trench has a refractive index that is close to the refractive index of the core material 16 of the four waveguides 20–26. Fluid fill-holes 34 and 36 may be used to provide a steady supply of fluid, but this is not critical. In the operation of the switching element, one of the heaters 38 and 40 is brought to a temperature sufficiently high to form a gas bubble. Once formed, the bubble can be maintained in position with a reduced current to the heater. In FIG. 1, the bubble is positioned at the crosspoint 30 of the four waveguides. Consequently, an input signal along the waveguide 20 will encounter a refractive index mismatch upon reaching the trench 28. This places the switching element in a reflecting state, causing the optical signal along the waveguide 20 to be redirected to the output waveguide 22. However, even in the reflecting state, the second input waveguide 24 is not in communication with the output waveguide 26.

If the heater 38 at crosspoint 30 is deactivated and the second heater 40 is activated, the bubble will be attracted to the off-axis heater 40. This allows index-matching fluid to fill the crosspoint 30 of the waveguides 20–26. The switching element 10 is then in a transmitting state, since the input waveguide 20 is optically coupled to the collinear waveguide 26.

In the 5×5 matrix 32 of FIG. 2, any of the five input waveguides 42, 44, 46, 48 and 50 may be optically coupled to any one of the five output waveguides 52, 54, 56, 58 and 60. The switching matrix is sometimes referred to as a "non-blocking" matrix, since any free input fiber can be connected to any free output fiber regardless of which connections have already been made through the switching matrix. Each of the twenty-five optical switches has a trench that causes TIR in the absence of a fluid at the crosspoint of the waveguides, but two collinear waveguides of a particular waveguide path are optically coupled when the crosspoint associated with the waveguides is filled with the fluid. Trenches that are in the transmissive state are represented by fine lines that extend at an angle through the intersections of the optical waveguides in the matrix. On the other hand, trenches of switching elements in a reflecting state are represented by broad lines through points of intersection.

In FIGS. 1 and 2, the input waveguide 20 is in optical communication with the output waveguide 22, as a result of TIR at the crosspoint 30. Since all other crosspoints for allowing the input waveguide 48 to communicate with the output waveguide 54 are in a transmissive state, a signal that is generated at input waveguide 48 will be received at output waveguide 54. In like manner, the input waveguide 42 is optically coupled to the output waveguide 60, the input waveguide 44 is optically coupled to the output waveguide 56, the input waveguide 46 is optically coupled to the output waveguide 52, and the input waveguide 50 is optically coupled to the output waveguide 58.

One concern with optical switching elements 10 of this type is that in the transmissive state, there is a small but potentially objectionable amount of reflection. If the index of refraction of the fluid is different than that of the core material 16, reflections occur. A precise match between the indices of refraction is problematic, since there are other considerations in the selection of a fluid. For example, since the fluid is manipulated using thermal energy, the thermal properties of the liquid must be considered. Thus, there is a loss of signal strength at each transmissive crosspoint within the matrix 32.

In FIG. 2, an optical signal that enters the input waveguide 48 Input Port 3) will pass through one crosspoint in the horizontal direction and three crosspoints in the vertical direction, since the optical signal will be reflected at the switching element 10. The total loss is 1 k+3 k=4 k, where k is the loss associated with each crosspoint. On the other hand, an optical signal entering the input waveguide 50 (Input Port 4) will propagate through the output waveguide 58 (Output Port 3), thereby passing through three crosspoints in the horizontal direction and four crosspoints in the vertical direction. The total loss is 3 k+4 k=7 k. In the figure, the input ports are shown as having a ranking from 0 to 4. Likewise, the output ports are shown as having a ranking from 0 to 4. The lower order inputs require fewer traversals of the optical crosspoints for coupling to a given output, while the lower order outputs require fewer crosspoint traversals by an optical signal for coupling to a given input. Thus, there are location-dependent losses within the operation of the matrix. There is also a loss that is encountered at each crosspoint that is in the reflecting state, but this loss is not dependent upon location.

Concerns with location-dependent losses are compounded when switching units such as the one found in FIG. 2 are cascaded to form a multistage switch. A multistage switch formed of cascaded switching units is described in U.S. Pat. No. 5,903,686 to MacDonald. The switch enables manipulation of P optical signals to P locations in a non-blocking manner using a number of interconnected functionally identical switching units. The multistage switch is intended to be an improvement over the conventional "Clos" network. According to the Clos design, a three-stage switch includes P input switching units having N input ports and M output ports. The conventional Clos switch also includes M middle stage switching units of P input ports and P output ports. Finally, there are P output switching units of M input ports and N output ports. For such a switch to be non-blocking without requiring additional connections, M=2N−1. It has been posited that with intelligent routing, the minimum value of M is 3/2N, but this has not been proven.

In following the conventional Clos design, the least loss path through the switch is 0k and the greatest loss path is 2(N+M+P−3)k. FIG. 3 illustrates a conventional interconnect technique for a three-stage switch. In the switch of FIG. 3, there are five input switching units and five output switching units (P=5), but only three input switching units and three output switching units are shown. In the figure, M=5 and N=5. Moreover, there are five middle stage switching units $M_2$=5. For clarity, only some of the interconnections are shown in the figure. The switching units are interconnected by coupling output port 0 at input unit 1 to input port 0 of middle unit 1, output port 1 of input unit 1 to input port 0 of middle unit 2, and so. The output port 0 of input unit 2 is connected to the middle unit input port 1, output port 1 is connected to middle unit 1 input port 1, and so on. The switch structure is symmetrical, so that connections from the middle units to the output units follow the same pattern.

Although the minimum number of middle stage switching units is 2N−1, there is an advantage to using 2 m middle units, since this provides non-blocking routing even with single crosspoint failures in the input and output switching units or with the failure of a complete middle unit.

A larger scale switch may be a 128×128 three-stage non-blocking crosspoint switch with fault tolerance. In such a switch, there would be sixteen input switching units (i.e., P=16) of size 8×16 (i.e., N=8, M=16), sixteen middle units (i.e., $M_2$=16) of size 16×16, and sixteen output switching units of size 16×8. With an interconnect as described with reference to FIG. 3, the least loss would be 0k and the worst loss would be 74 k, or 37 k±37 k. This worst case scenario of 74k would accumulate from a total of 22 k in the input stage, 30k in the middle stage, and 22k in the output stage.

What is needed is a multistage optical switch having an increased level of uniformity with respect to location-dependent losses.

SUMMARY OF THE INVENTION

A multistage optical switch includes a stage-to-stage interconnection scheme that provides equalization of location-dependent losses. Each stage includes more than one switching unit having a first array of input ports and a second array of output ports that are selectively coupled by switching optical crosspoints between transmissive states and reflective states. The input ports of a particular switching unit have a ranking (i.e., order) from lowest to highest. Similarly, the output ports of the same switching unit have a ranking from lowest to highest. The rankings are reflective of the number of optical crosspoints that must be traversed by optical signals propagating between input and output ports having the same ranking. In accordance with the connection scheme, high ranking output ports of switching units of one stage are optically coupled to low ranking input ports of the switching units of the subsequent stage, thereby defining stage-to-stage optical paths that ensure some equalization in the sums of the optical crosspoints that are traversed when optical signals propagate through the two stages.

In the preferred embodiment, each switching unit of the first stage has M output ports with a ranking of 0 through M−1, while each switching unit of the second stage has P input ports with a ranking of 0 through P−1. The output ports of the first stage switching units are coupled to the input ports of the second stage switching units in a reverse ranking. That is, the 0 through M−1 output ports of the first stage are respectively connected to the P−1 through 0 input ports of the second stage. Also in the preferred embodiment, the optical switch is a non-blocking switch. In a three-stage non-blocking arrangement, there is an equal number (P) of input switching units, output switching units, input ports for each middle switching unit, and output ports for each middle switching unit. Moreover, there is an equal number (M) of middle switching units, output ports for each input switching unit, and input ports for each output switching unit. It follows that there is an equal number (N) of input ports for each input switching unit and output ports for each output switching unit.

The connectivity from the second stage switching units to the third stage switching units is a reversal of the connectivity from the first stage to the second stage. Likewise, any stage-to-stage connection for subsequent switching units is preferably a reversal of the earlier stage interconnectivity.

Each optical crosspoint is a switching region that is manipulable between a transmissive state and a reflective state. While not critical, the switching mechanism is preferably a manipulation of refractive index-matching fluid at a crosspoint of optical waveguides. The fluid has a refractive index that is similar to the refractive index of the waveguide material. In the absence of fluid at the crosspoint, optical signals are reflected. On the other hand, the presence of the index-matching fluid at a crosspoint allows optical signals to propagate through the crosspoint.

As noted, the preferred embodiment connects the greatest loss path of an early-stage switching unit to the least-loss path of a subsequent stage switching unit and connects the least-loss path of the early-stage switching unit to the greatest-loss path of the subsequent stage switching unit. For purposes of description, the ports of the first stage may be designated as I (P, M), where P is the unit number (1 through N) and M is the output port of P (0 through M−1). The ports of the second stage may be designated as Mid ($M_2$, $P_2$), where $M_2$ is the unit number (1 through M) of the middle units and $P_2$ is the input port (0 through $P_2$−1) of the unit. Then, in an equal-loss interconnect scheme:

I (1, 0) connects to Mid (1, $P_2$−1)

I (1, 1) connects to Mid (2, $P_2$−2)

I (1, 2) connects to Mid (3, $P_2$−3) . . .

I (1, M−1) connects to Mid (M, 0)

I (2, 0) connects to Mid (2, $P_2$−1) . . .

I (2, M−2) connects to Mid (M, 1)

I (2, M−1) connects to Mid (1, 0) . . .

The connectivity scheme is symmetrical, so that the connections of the middle stage to the output stage are a mirror image of the connections of the middle stage to the input stage. The connectivity scheme can be used to reduce loss in switches of any size, including those associated with any ratio of M/N.

An advantage of the invention is that the location-dependent loss is significantly normalized. That is, the connectivity scheme enhances equalization of the loss (k) that is associated with traversals of the crosspoints. As previously noted, the prior art 128×128 three-stage non-blocking crosspoint switch has a best-case loss of 0k and a worst-case loss of 74 k. This worst case scenario of 74 k occurs as a result of an accumulation of a total of 22 k in the input stage, 30k in the middle stage, and 22 k in the output stage. On the other hand, the interconnectivity scheme described above provides a least-loss path of 30k and a worst-loss path of 44 k (i.e., 37 k±7 k). This worst-case loss is an accumulation of 22 k in the input stage, 0k in the middle stage, and 22 k in the output stage. The least-loss path is an accumulation of 0k in the input stage, 30k in the middle stage, and 0k in the output stage. The equalization of location-dependent loss enhances performance and predictability of the switch.

DETAILED DESCRIPTION

Figure 4:
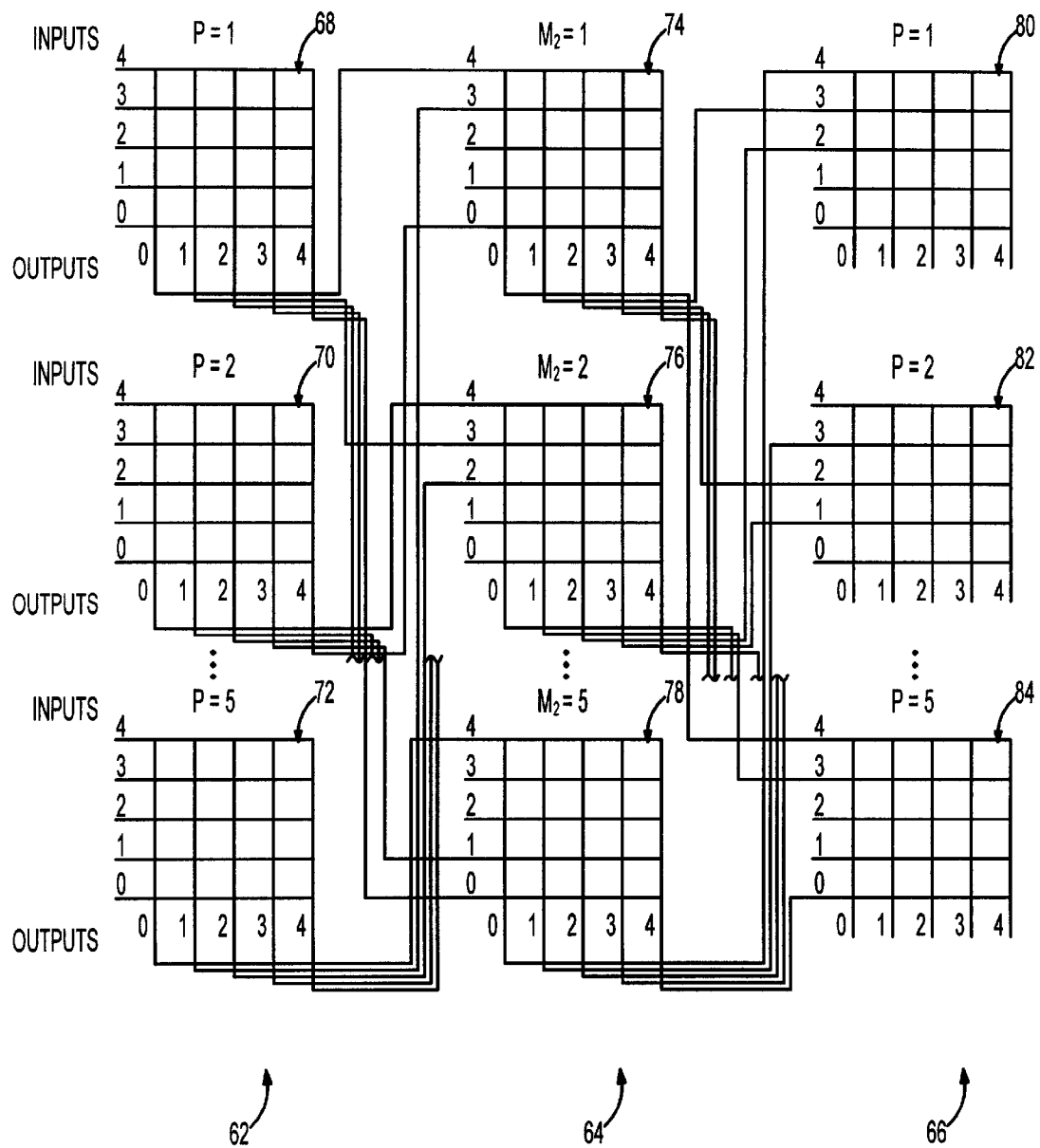
FIG. 4 is a schematic view of a multistage switch having a stage-to-stage connectivity scheme in accordance with the invention.

FIG. 4 is a schematic view of a multistage switch having a connectivity scheme that is designed to enhance uniformity and location-dependent losses as optical signals propagate through the switch. For simplicity, the switch is not shown as being a non-blocking switch that allows a full range of output selectivity even when switching elements malfunction. However, the connectivity scheme to be described below may be adapted to other types of multistage switches. In the embodiment of FIG. 4, there are five switching units in each of three stages 62, 64 and 66. For purposes of illustration, only three of the five switching units are shown in the figure. Within the input stage 62, switching units 68, 70 and 72 are shown. The middle stage 64 includes the three switching elements 74, 76 and 78. The three illustrated switching units of the output stage 66 are units 80, 82 and 84.

Figure 1:
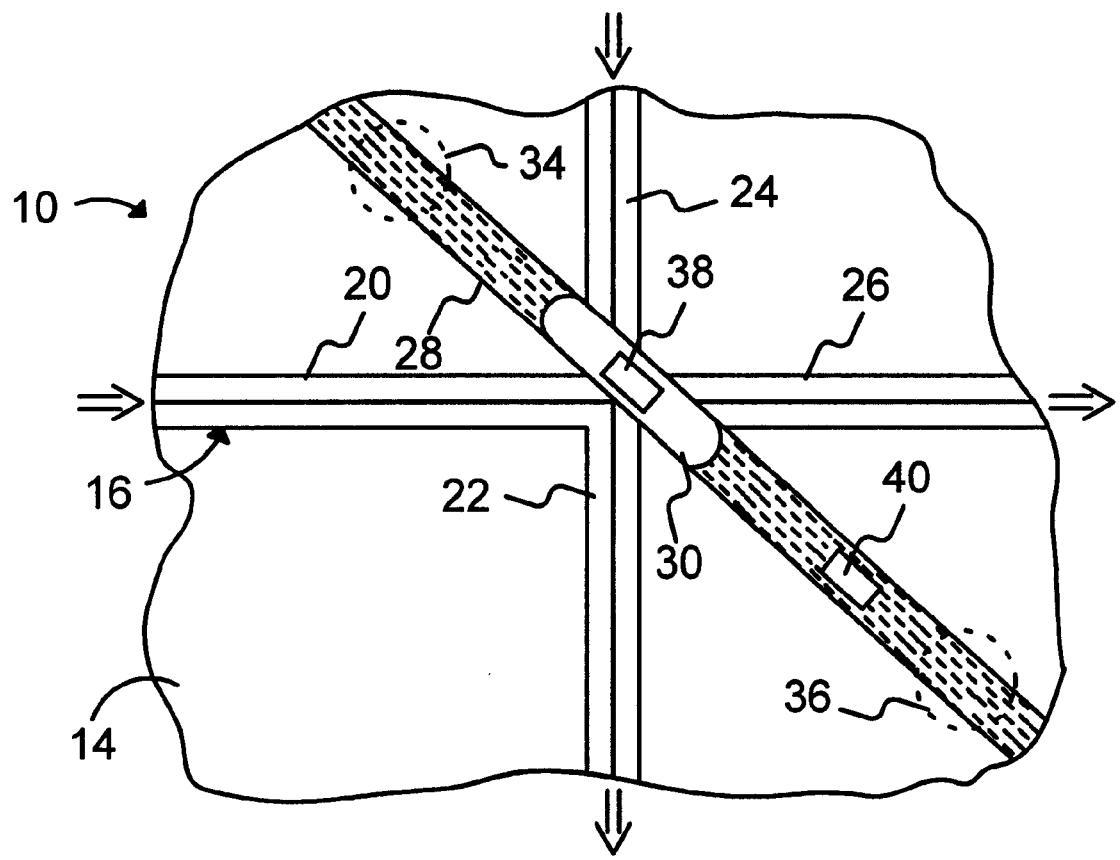
FIG. 1 is a top view of an optical switching element that utilizes total internal reflection in accordance with the prior art.
Figure 2:
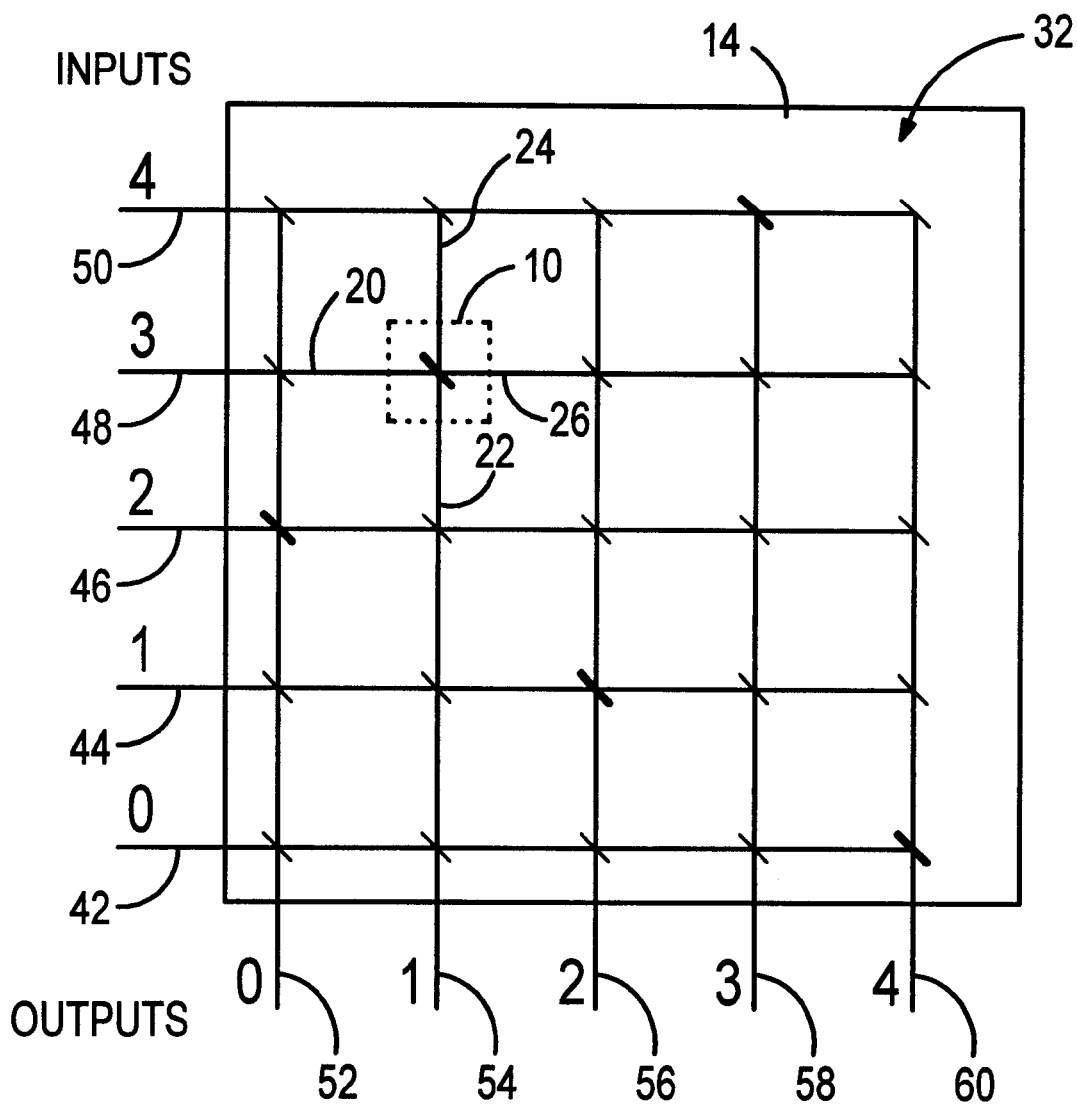
FIG. 2 is a 5×5 matrix of switching elements of FIG. 1 to allow connection of any one of five input waveguides to any one of five output waveguides in accordance with the prior art.

Each of the switching units 68–84 of FIG. 4 may be a duplication of the matrix 32 described with references to FIGS. 1 and 2. However, other embodiments of optical switching units may be incorporated, including ones in which mirrors are manipulated in order to switch crosspoints between transmissive and reflective states.

The output ports of each input switching unit 68, 70 and 72 may be designated as (P, M), where P is the unit number (1 through N) and M is the output port of P (0 through M−1). The input ports of the middle units 74, 76 and 78 may be designated as Mid ($M_2$, $P_2$), where M2 is the unit number (1 through M) of the middle unit and $P_2$ is the input port (0 through $P_2$−1) of the unit. The conventional form of a non-blocking three stage switch is P input units of size N input ports and M output ports, M middle stage units of P input ports and P output ports, and P output units of M input ports and N output ports. It has been shown that if M=2N−1, non-blocking switching can be achieved without reconfiguring additional connections.

Table 1 identifies the connectivity of the output ports of the first stage 62 to the input ports of the second stage 64. For example, the output port I (1, 0) is connected to Mid (1, 4). The last output port I (5, 4) is connected to the middle stage input port Mid (4, 0).

TABLE 1

| INPUT STAGE TO MIDDLE STAGE CONNECTIVITY | | | | | |
|---|---|---|---|---|---|
| | M = 0 | M = 1 | M = 2 | M = 3 | M = 4 |
| P = 1 | 1, 4 | 2, 3 | 3, 2 | 4, 1 | 5, 0 |
| P = 2 | 2, 4 | 3, 3 | 4, 2 | 5, 1 | 1, 0 |
| P = 3 | 3, 4 | 4, 3 | 5, 2 | 1, 1 | 2, 0 |
| P = 4 | 4, 4 | 5, 3 | 1, 2 | 2, 1 | 3, 0 |
| P = 5 | 5, 4 | 1, 3 | 2, 2 | 3, 1 | 4, 0 |

As can be seen in Table 1, each of the first output ports I (P, 0) of each switching 68, 70 and 72 of the first stage 62 is connected to a fifth input port Mid (M, 4) of a middle switching unit 74, 76 and 78. Conversely, each fifth output port I (P, 4) of the first stage 62 is connected to one of the first input ports Mid ($M_2$, 0) of the middle stage 64. As a result, any optical signal that enters the first stage and exits the second stage will have a location-dependent loss of 8 k, if the optical signal enters and exits the first stage via input and output ports of the same rank and enters and exits the second stage via input and output ports of the same rank.

Figure 3:
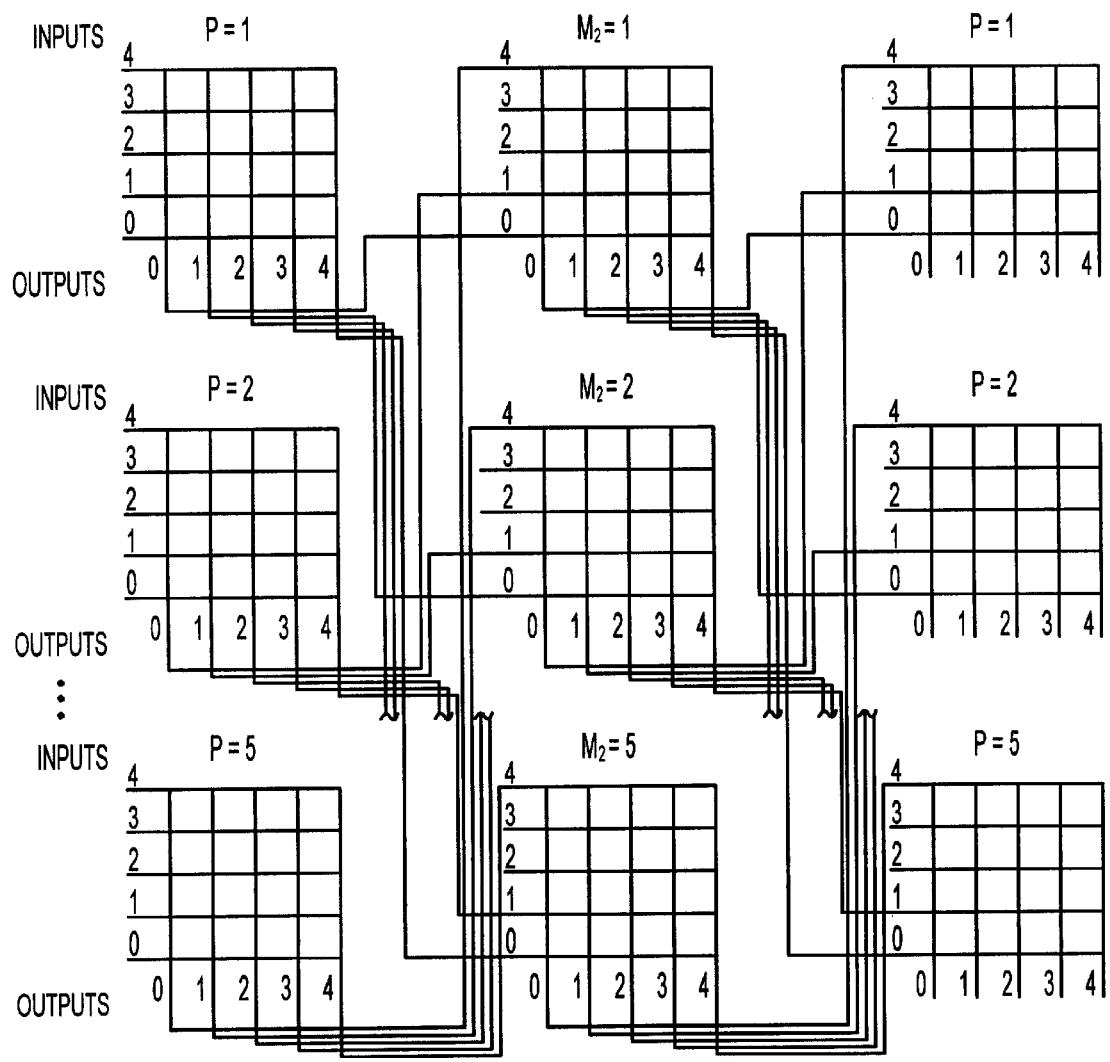
FIG. 3 is a schematic view of a multistage switch that utilizes a stage-to-stage connectivity scheme in accordance with the prior art.

Table 2 identifies the conventional connectivity scheme, which is illustrated in FIG. 3. The first output port of the first switching unit I (1, 0) is connected to the input port Mid (1, 0). Consequently, the total loss will be 0k+0k=0k. On the other hand, the output port I (5, 4) is connected to the input port Mid (5, 4), so that the location-dependent loss is equal to 8 k+8 k=16 k. The connectivity scheme is duplicated in the connections of the output ports of the second stage to the input ports of the third stage. Therefore, the best case location-dependent loss for the switch of FIG. 3 is 0k, while the worst case loss is 24 k. This differential is not a desirable situation.

TABLE 2

CONVENTIONAL CONNECTIVITY

|  | M = Ø | M = 1 | M = 2 | M = 3 | M = 4 |
| --- | --- | --- | --- | --- | --- |
| P = 1 | 1, Ø | 2, Ø | 3, Ø | 4, Ø | 5, Ø |
| P = 2 | 1, 1 | 2, 1 | 3, 1 | 4, 1 | 5, 1 |
| P = 3 | 1, 2 | 2, 2 | 3, 2 | 4, 2 | 5, 2 |
| P = 4 | 1, 3 | 2, 3 | 3, 3 | 4, 3 | 5, 3 |
| P = 5 | 1, 4 | 2, 4 | 3, 4 | 4, 4 | 5, 4 |

Returning to FIG. 4 and Table 1, the connectivity scheme from the first stage 62 to the second stage 64 is symmetrical, so that the connectivity from the second stage 64 to the third stage 66 may be a mirror image. Table 3 identifies the connections from the second stage 64 to the third stage 66. In comparing Tables 1 and 3, the optical couplings which have a potential loss of 8 k in the first stage 62 will have a potential loss of Øk in the second stage 64 and will have a potential loss of 8 k in the third stage 66. At the other extreme, the optical couplings which have a potential loss of Ø in the first stage have a potential loss of 8 k in the second stage and a potential loss of Øk in the third stage. The differential between the least-loss path and the greatest-loss path is therefore 8 k. This compares favorably to the differential of 24 k when the connectivity scheme of Table 2 is utilized.

TABLE 3

MIDDLE STAGE TO OUTPUT STAGE CONNECTIVITY

|  | M = Ø | M = 1 | M = 2 | M = 3 | M = 4 |
| --- | --- | --- | --- | --- | --- |
| $M_2$ = 1 | 5, 4 | 1, 3 | 2, 2 | 3, 1 | 4, Ø |
| $M_2$ = 2 | 4, 4 | 5, 3 | 1, 2 | 2, 1 | 3, Ø |
| $M_2$ = 3 | 3, 4 | 4, 3 | 5, 2 | 1, 1 | 2, Ø |
| $M_2$ = 4 | 2, 4 | 3, 3 | 4, 2 | 5, 1 | 1, Ø |
| $M_2$ = 5 | 1, 4 | 2, 3 | 3, 2 | 4, 1 | 5, Ø |

As previously noted, the connectivity scheme is preferably used in non-blocking switch arrangements. The connectivity provides equalization of loss in switches of any size and in switches that use any ratio of M/N.

What is claimed is:

1. A multistage optical switch in which each stage includes a plurality of switching units having arrays of input ports and output ports, said input ports of each array and said output ports of each array having a ranking from lowest to highest, each switching unit including an arrangement of optical switching regions for selectively coupling said input ports to said output ports, said switching regions being arranged such that the number of switching regions an optical signal traverses within said each switching unit is dependent on said rankings of specific input and output ports through which said optical signal is propagated, where said number increases in correspondence with increases in said rankings of said specific input and output ports, said optical switch comprising:
    a first stage of said switching units; and
    a second stage of said switching units for which high ranking input ports of said switching units of said second stage are optically coupled to low ranking output ports of said switching units of said first stage, thereby achieving at least some equalization in sums of said numbers of said switching regions through which optical signals propagate when optical signals are input at said first stage and output at said second stage.

2. The optical switch of claim 1 further comprising a third stage of said switching units, wherein high ranking input ports of said third stage are optically coupled to low ranking output ports of said second stage.

3. The optical switch of claim 2 wherein optical coupling of said input ports of said third stage to output ports of said second stage is a reversal of the arrangement of optical coupling of input ports of said second stage to output ports of said first stage.

4. The optical switch of claim 1 wherein each said switching region has a transmissive state and a reflective state, said optical coupling of input ports and output ports of a particular switching unit being dependent on transmissive and reflective states of said switching regions.

5. The optical switch of claim 1 wherein each said switching unit of said first stage has M output ports having a ranking of Ø through M−1, each said switching unit of said second stage having P input ports having a ranking of Ø through P−1, said output ports of each said switching unit of said first stage being coupled to an input port of said second stage in a reverse ranking, such that input ports having rankings of Ø and M−1 are respectively connected to output ports having rankings of P−1 and Ø.

6. The optical switch of claim 5 wherein said first stage has P switching units and each switching unit of said first stage is optically coupled to each switching unit of said second stage via said optical input and output ports.

7. The optical switch of claim 6 wherein each said switching unit of said first stage has a Ø output port coupled to a P−1 input port of a first specific one of said switching units of said second stage and has an M−1 output port coupled to a Ø input port of a second specific one of said switching units of said second stage, and wherein only one output port of said each switching unit of said first stage is optically coupled to said input ports of any one of said switching units of said second stage.

8. The optical switch of claim 1 wherein said switching regions are optical crosspoints in which transmissivity to propagating optical signals is a function of a presence or absence of refractive index-matching fluid within individual optical crosspoints, said optical crosspoints being at intersections of waveguides having a refractive index generally matching a refractive index of said fluid.

9. The optical switch of claim 8 wherein said waveguides and optical crosspoints of each of said switching units are arranged such that a number of optical crosspoints that are traversed in order to optically couple a selected one of said input ports to a selected one of said output ports is directly dependent upon a sum of said rankings of said selected ones of said input and output ports.

10. The optical switch of claim 9 further comprising a third stage of said switching units for which input ports are optically coupled to output ports of said second stage in an order that is dependent on said rankings.

11. A multistage optical switch comprising:
    a plurality of first stage switches having inputs and outputs that are selectively coupled by manipulation of optical properties at optical crosspoints of waveguides, said inputs and outputs being arranged and ordered relative to said waveguides such that lower order inputs require fewer traversals of said optical crosspoints for coupling to a given output and such that lower order outputs require fewer traversals of said optical crosspoints for coupling to a given input;
    a plurality of second stage switches having structural and operational similarities to said first stage switches, said second stage switches having inputs optically coupled to said outputs of said first stage switches in a reverse order such that said low order outputs of said first stage switches are coupled to high order inputs of said second stage switches and such that high order outputs of said first stage switches are coupled to low order inputs of said second stage switches; and a plurality of third stage switches having structural and operational similarities to said second stage switches, said second stage switches having inputs optically coupled to outputs of said second stage switches in a reverse order such that low order outputs of said second stage switches are coupled to high order inputs of said third stage switches and such that high order outputs of said second stage switches are coupled to low order inputs of said third stage switches.

12. The optical switch of claim 11 wherein said inputs of said second stage switches are arranged in a first sequential order and wherein said outputs of said first stage switches are arranged in a second sequential order, said inputs of said second stage switches being coupled to said outputs of said first stage switches in a reverse order such that inputs associated with requirements of a high number of crosspoint traversals are coupled to outputs associated with requirements of a low number of crosspoint traversals.

13. The optical switch of claim 12 wherein said inputs of said third stage switches are coupled to said outputs of said second stage switches in a reverse order similar to said reverse order of said outputs and inputs of said second and first stage switches.

14. The optical switch of claim 11 wherein there are P first stage switches and P third stage switches, each of said second stage switches having P inputs with a one-to-one correspondence to said P first stage switches, each of said second stage switches having P outputs with a one-to-one correspondence to said P third stage switches.

15. The optical switch of claim 11 wherein each said optical crosspoint has a transmissive state when liquid resides at said optical crosspoint and has a reflective state when there is an absence of said liquid.

16. A method for use in a multistage optical switch in which each stage includes a plurality of switching units having arrays of input ports and output ports, with said input ports in each array and said output ports in each array having a ranking from lowest to highest, each said switching unit including an arrangement of optical crosspoints arranged such that the number of optical crosspoints an optical signal traverses within said each switching unit is dependent upon said rankings of specific input and output ports through which said optical signal is propagated, where said number increases in correspondence with increases in said rankings of said specific input and output ports, said method comprising a step of:

connecting output ports of a preceding stage with input ports of a succeeding stage such that optical signals likely to have had a relatively high number of traversals of optical crosspoints within said preceding stage have a likelihood of having a relatively low number of traversals of optical crosspoints within said succeeding stage, which optical signals having a relatively low number of traversals of optical crosspoints within said preceding stage have a likelihood of having a relatively high number of traversals of optical crosspoints within said succeeding stage.

17. The method of claim 16 further comprising a step of connecting output ports of said succeeding stage to input ports of a second succeeding stage in a pattern that is a reversal of a pattern for connecting said input and output ports of said succeeding and preceding stages.

18. The method of claim 16 wherein said step of connecting includes coupling said input ports having a high ranking to said output ports having a low ranking.

19. The method of claim 16 wherein said step of connecting is implemented to achieve some equalization of the numbers of optical crosspoints are required to traverse in propagating through said preceding and succeeding stages.

* * * * *